S. A. ERDAHL.
APPLE CUTTER AND CORER.
APPLICATION FILED AUG. 6, 1919.

1,328,503. Patented Jan. 20, 1920.

Witnesses
Frank S. Ratcliffe
J. A. Buch

Inventor
S. A. Erdahl.
By Chandler & Chandler
Attorneys

UNITED STATES PATENT OFFICE.

SIVERT A. ERDAHL, OF MADISON, MINNESOTA.

APPLE CUTTER AND CORER.

1,328,503. Specification of Letters Patent. Patented Jan. 20, 1920.

Application filed August 6, 1919. Serial No. 315,665.

*To all whom it may concern:*

Be it known that I, SIVERT A. ERDAHL, a citizen of the United States, residing at Madison, in the county of Lac qui Parle, State of Minnesota, have invented certain new and useful Improvements in Apple Cutters and Corers; and I do hereby declare the following to be a full, clear, and exact description of the invention, such as will enable others skilled in the art to which it appertains to make and use the same.

This invention relates to an apple cutter and corer and the primary object of the invention is to provide a simple, novel and efficient form of cutter and corer whereby an apple or the like may be removed of its core and cut in a single operation or simply removed of its core.

With these and other objects in view, the invention consists of certain other combinations and arrangements of parts, as will be hereinafter more fully described and claimed, it being a still further object of the invention to provide a device which will not be likely to get out of working order.

In the drawings:—

Figure 1:
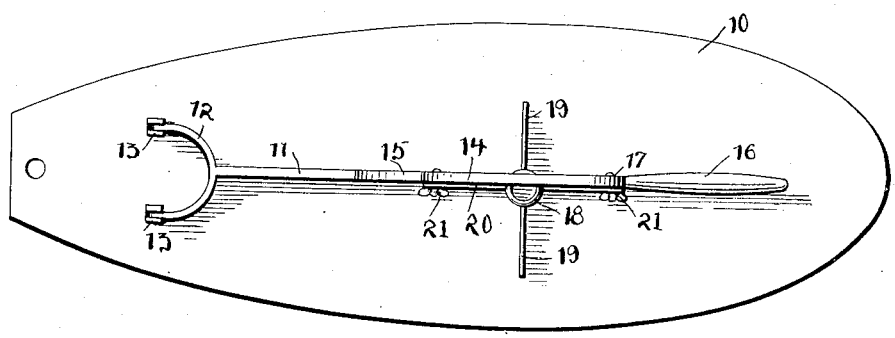
Figure 1 is a top plan view of the device.
Figure 2:
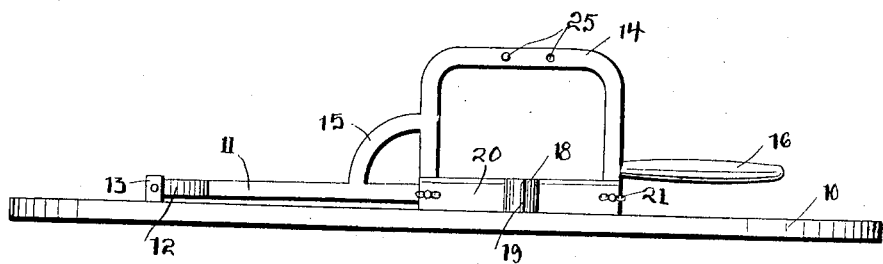
Fig. 2 is a side elevation thereof.

Referring to the drawings in detail, there is shown a base board or the like 10 to which is secured a beam or lever 11, the latter having a forked end 12, the forks of which are pivotally connected to bearings 13 secured to one end of the base board 10 and said lever is further provided with an arched portion 14 extended upwardly and braced to the bar by means of an integral connecting portion 15 while the rear extremity of the lever is provided with a hand grip 16 for operation of the device which will be hereinafter set forth.

The lower end portions of the arched portions 15 are provided with perforations 17 adapted for attachment of a cutting member and corer which comprises a cylindrical blade member 18 having knives 19 extending from diametrically opposite sides thereof and similar knives 20 which are disposed at right angles to the adjacent knives and connected through the perforations by means of thumb screws 21, thereby rendering the parts readily removable for any purpose such as cleaning or for the attachment of a modified form of cutting member as will be hereinafter set forth.

In the use of the cutting member which is described, the apple or the like is placed with its core directly beneath the cylindrical cutting member after the lever has been raised upon its pivots and pressure is then exerted upon the handle of the lever to cause the core to pass through the cylindrical cutting member and the knives to sever the apple into pieces.

Figure 3:
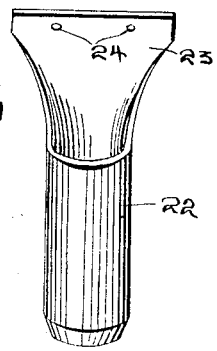
Fig. 3 is a detailed perspective view of an attachment adapted for removing the core of an apple or the like without cutting the apple.

In Fig. 3 of the drawings there is shown a cutting member adapted for use in simply removing the core of the apple and said member comprises a cylindrical blade 22 which is provided with an integral and enlarged attaching plate portion 23 having perforations 24 therethrough which are adapted to be secured through the perforations 25 in the upper portion of the arch 14 by means of the thumb screws 21 after the aforesaid cutting member has been removed and when operated in the manner just described, the core of the apple will be removed without dividing the apple. I wish to have it understood that the devices are to be made in such sizes as would prove desirable in use, it being understood that small apples such as crab apples will require smaller blades than the larger apples.

I claim:—

1. An implement of the class described comprising a base, a lever pivoted on the base and having an arched portion with a hand grip at its extreme end, said arched portion having perforations in its lower extremities and at its upper portion and cutting members having apertured portions adapted for removable attachment through the perforations.

2. In an apple cutter and corer, a base, a beam having a forked extremity, bearings to which said forks are pivotally connected, said beam extending over the base and having a hand grip at its outer end with an intermediate arched portion, a base for said arched portion, a cylindrical blade and knife members extending from diametrically opposite sides thereof at right angles to each other, the extremities of two of the knives being connected to the lower portions of the arch as and for the purpose described.

In testimony whereof, I affix my signature, in presence of two witnesses.

SIVERT A. ERDAHL.

Witnesses:
A. A. ERDAHL,
E. H. GULLORD.